Oct. 31, 1944.  J. J. NEFF  2,361,788

DISPLACEMENT PICKUP

Filed Aug. 2, 1943  4 Sheets-Sheet 1

INVENTOR.
JOSEPH J. NEFF
BY
*Frank N. Harmon*
ATTORNEY

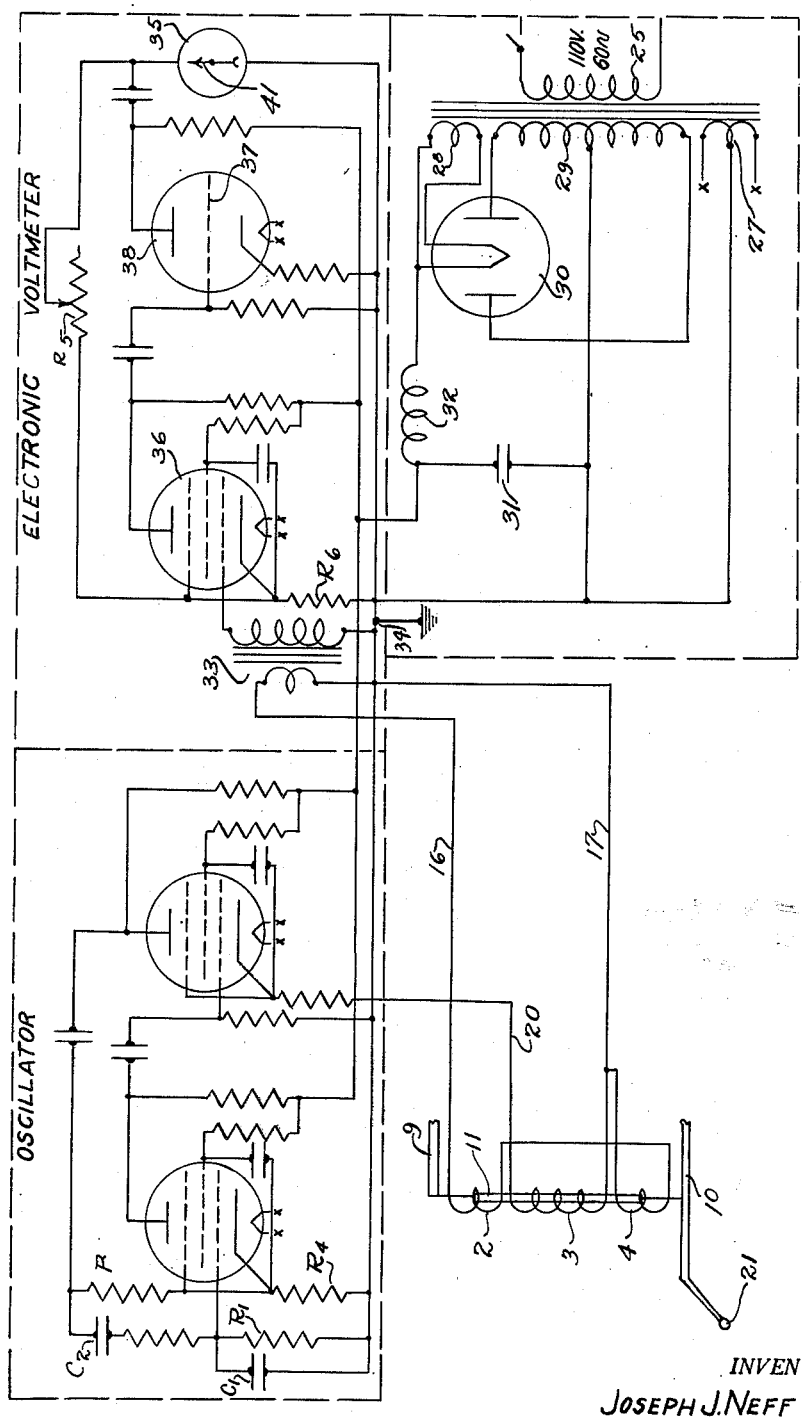

Oct. 31, 1944. J. J. NEFF 2,361,788
DISPLACEMENT PICKUP
Filed Aug. 2, 1943 4 Sheets-Sheet 3

INVENTOR.
JOSEPH J. NEFF.
BY
Frank H. Harmon

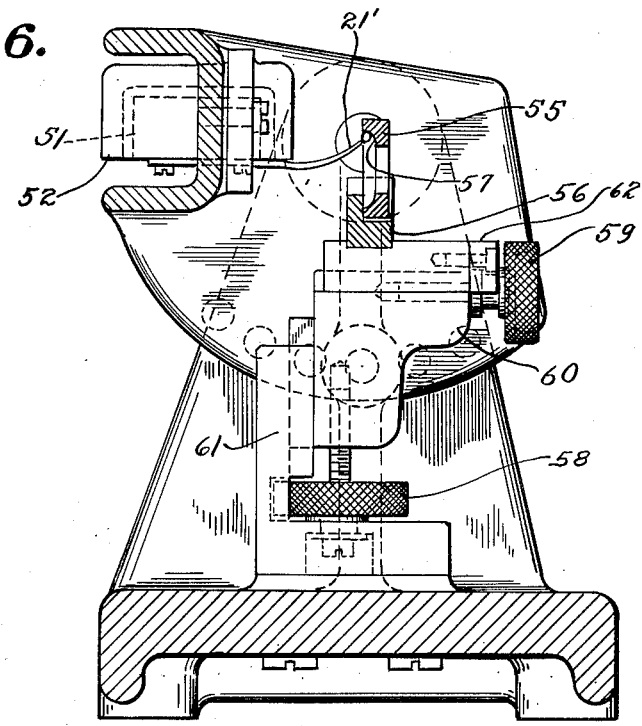

Patented Oct. 31, 1944

2,361,788

UNITED STATES PATENT OFFICE 2,361,788

DISPLACEMENT PICKUP

Joseph J. Neff, South Euclid, Ohio, assignor, by mesne assignments, to Jack & Heintz, Inc., Cleveland, Ohio, a corporation of Ohio Application August 2, 1943, Serial No. 497,087

6 Claims. (Cl. 73—104)

This invention relates to a precision displacement pickup mechanism for indicating irregularities in work surfaces.

It is often desirable to make a precision inspection of finished surfaces to determine their conformance to relatively close tolerance requirements. It is, therefore, the primary object of this invention to provide an electrical displacement pickup mechanism capable of measuring or indicating minute irregularities in such surfaces.

A more specific object is to provide an electrical displacement pickup instrument for close inspection of geometrically regularly shaped machined metal surfaces to determine whether those surfaces are being machined properly and whether any irregularities such as scratches are present on the contours of such metal surfaces.

With these and other objects in view, the invention resides in the combination of parts and in the details of construction and operation herein after set forth in the following specification and appended claims, certain embodiments thereof being illustrated in the accompanying drawings in which:

Figure 3 is a circuit diagram for a displacement pickup instrument including a resistance-condenser tuned oscillator and an electronic voltmeter.

Figure 6 is a view in side elevation of a radius contour inspecting mechanism taken through section 6—6 of Figure 4.

Figure 1:
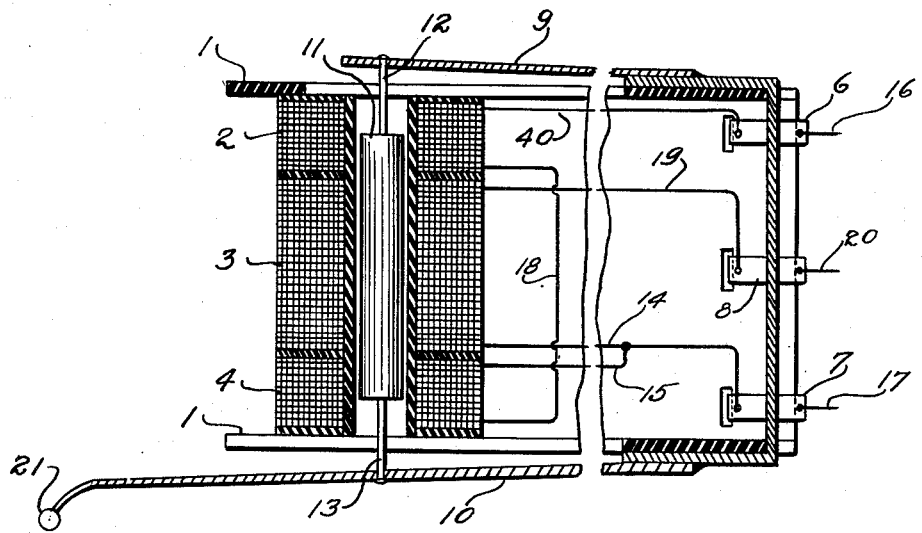
Figure 1 is a sectional view in side elevation of a displacement pickup mechanism showing a work contacting stylus, a driving coil and two pickup coils, and a stylus controlled armature mounted centrally with respect to the coils.
Figure 2:
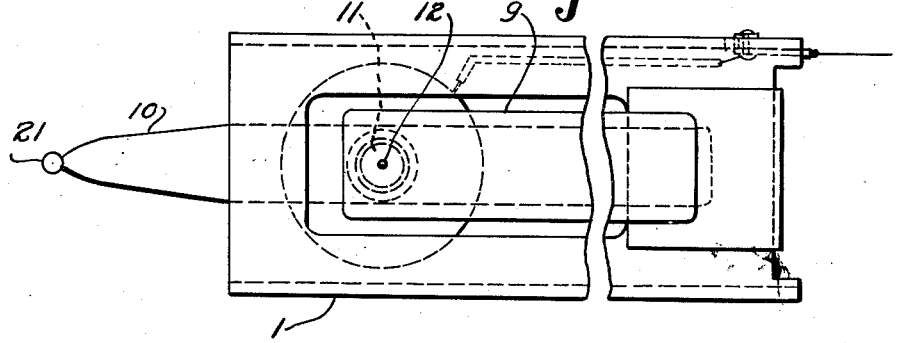
Figure 2 is a plan view of the displacement pickup mechanism similar to Figure 1.

Referring more particularly to Figure 1, a nonconducting casing 1 is shown supporting two pickup coils 2 and 4, a driving coil 3, contact plates 6, 7 and 8 and two flexible spring arms 9 and 10 which in turn support a soft iron armature 11 by means of pins 12 and 13. Arm 10 projects a predetermined distance beyond casing 1 and has a stylus 21 fixedly mounted on its extremity. Coil 2 which is shown connected by a line 40 to contact plate 6 is also connected in series with one end of coil 4 by means of a line 18. The other end of coil 4 is connected to a line 14 by means of line 15. One end of the driving coil 3 is connected to contact plate 8 by means of line 19, and the other end to contact plate 7 by means of line 14. Lines 16, 17 and 20 lead from contact plates 6, 7 and 8 respectively, to an oscillator and electronic voltmeter circuit which will be described later in this specification.

If the armature 11 is properly centered electrically with respect to the three coils, the voltages which may be induced in coils 4 and 2 by driving coil 3 are equal and are in opposition as a result of the coil connections, thereby neutralizing the effect of the pickup mechanism on the voltmeter. When pressure is exerted on stylus 21, armature 11 will be moved from its electrical center position so that the voltages induced in coils 2 and 4 by driving coil 3 will become unequal, and the difference in voltage may be measured by an electronic voltmeter or other suitable precision indicating device.

The difference in the magnitude of the induced voltages in coils 2 and 4 which results as the armature is moved from its electrical center position, is caused by the difference in the lines of force of the field, created by driving coil 3, cutting pickup coils 2 and 4. These lines of force are carried almost entirely by the soft iron armature which forms a part of the field pattern of the driving coil due to the fact that soft iron has a magnetic permeability several thousand times as great as air. Therefore, if in Figure 1, stylus 21 and arm 10 are forced downward, then armature 11 also moves downward, moving the magnetic field of driving coil 3 downward with it. More lines of forces are then cutting coil 4 than coil 2 and consequently more voltage is induced in coil 4 than in coil 2.

Alternating current for energizing the driving coil is received from a conventional resistance-capacity turned oscillator which forms a part of the circuit shown in Figure 3. This circuit is connected by means of a transformer 26 to a standard 110 volt 60 cycle source 25 as shown in the lower right extremity of Figure 3. The alternating current as received by the transformer is rectified by a full wave rectifier 30, and the resulting current is then filtered by a filter circuit consisting of a condenser 31 and a high reactance inductance 32 so that direct current is supplied to the plates and grids of the various tubes of the oscillator and the voltmeter. The series-parallel arrangement formed by condenser $C_2$ and resistor $R_2$ and the condenser $C_1$ and resistor $R_1$ in the oscillator circuit is a positive feedback network which determines the frequency of oscillation of the oscillator. Resistors $R_3$ and $R_4$ form a negative feedback network which stabilizes the frequency and amplitude of oscillation.

Any induced voltage differential occurring between coils 2 and 4, due to movement of the armature 11 from the electrical center of the three coils, may be measured by a conventional electronic voltmeter such as shown in Figure 3. Lines 16 and 17 are shown connecting the coils to a step-up transformer 33. Line 17 is also shown grounded at point 34 in the circuit. Since most surfaces to be inspected by the precision displacement pickup are relatively true, the electronic voltmeter must be able to detect any voltage difference caused by very minute displacements of the armature with respect to the cols. For this purpose an amplifier 36 is utilized in the voltmeter circuit. This amplifier controls the voltage of grid 37 in a triode 38. A milliammeter 35 is shown inserted in the circuit between the plate and cathode of the triode. Resistors $R_5$ and $R_6$ form a negative feedback network which stabilizes the amplification of the electronic voltmeter. A variable resistor, $R_5$, forms a shunt path for the milliammeter 35 and is used to adjust its sensitivity.

In order to read directly from the meter 35 the amount of irregularity in a surface, the scale of the meter is calibrated in thousandths of an inch, but it is understood that the calibration and sensitivity required depend upon the type of surface to be inspected. Although the meter is of a conventional style with zero milliamperes shown normally on the extreme left of the indicating scale and a full scale reading shown on the extreme right, for this invention a scale is provided which has a zero reading at midscale with plus and minus readings in fractional parts of an inch on either side.

Figure 5:
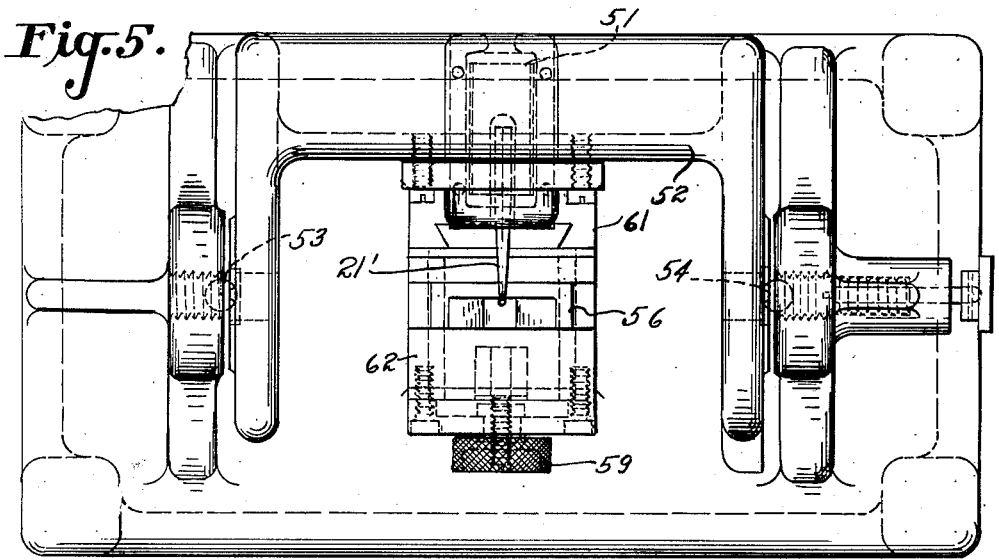
Figure 5 is a plan view of a radius contour inspecting mechanism similar to Figure 4.
Figure 4:
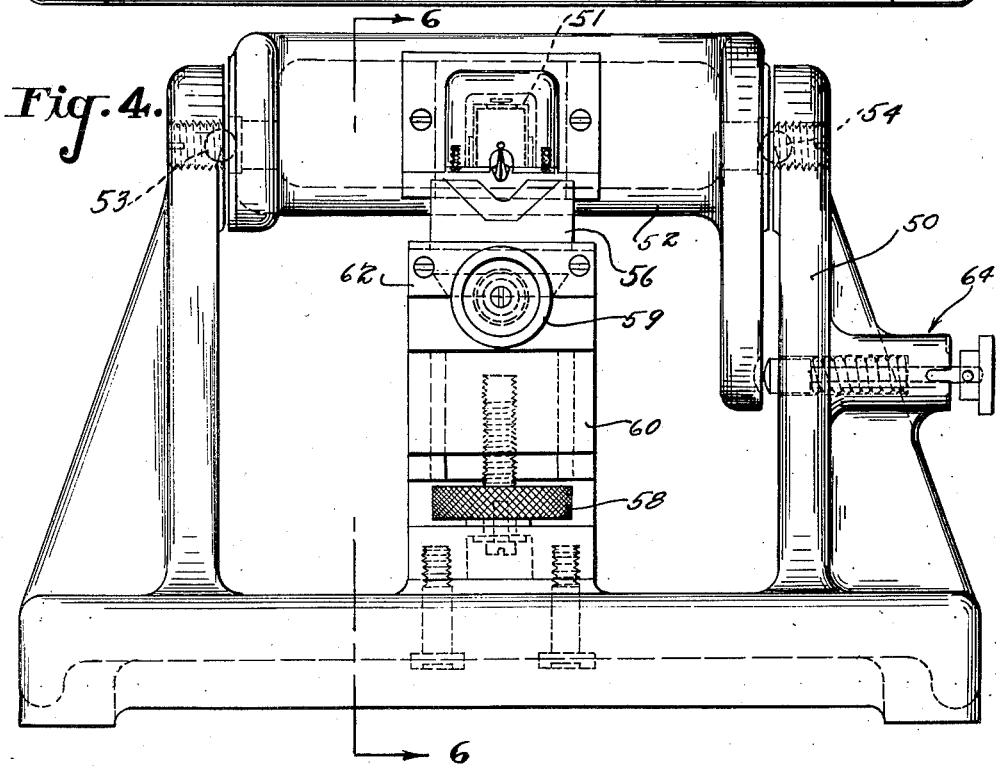
Figure 4 is a view in front elevation of a radius contour inspecting mechanism having a displacement pickup similar to Figure 1 mounted fixedly thereon.

In operation the stylus 21 is brought to bear on a true reference surface forcing armature 11 upward against the positive spring action of arms 9 and 10. As previously described, displacement of the armature from its electrical center causes a differential between the induced voltages in coils 2 and 4, said differential being transformed and amplified in the electronic voltmeter circuit. The meter indicator 41 is moved toward the right. Enough pressure is applied to the stylus to move the indicator over to a zero reading at midscale. Thus a zero reading is obtained for a desired true reference surface. The displacement pickup is then moved parallel to the surface on which inspection is desired. When the stylus is drawn across a scratch on a surface, the armature under action of spring arms 9 and 10 moves slightly downward, the induced voltages in coils 2 and 4 tend to become more equal and consequently the meter which is set up to read the difference between the two induced voltages indicates a minus reading, since less voltage is transformed by transformer 33. In this manner the depths of scratches on work surfaces are found accurately so as to determine whether or not they are within desired tolerance limits to make the work acceptable. As the displacement pickup is moved further, stylus 21 leaves the scratch and bears on the reference plane again. The armature is moved upward, the differential of induced voltage in coils 2 and 4 increases and the indicator of meter 35 will move back to its zero or reference reading. In a like manner, a positive reading of the meter is obtained if the stylus is drawn across a ridge above the reference plane, due to an increased voltage differential resulting from movement of the armature further out of the electrical center of the coils. Figures 4, 5 and 6 show views of a radius contour inspecting instrument having a displacement pickup mechanism 51 mounted fixedly to an arm 52 which is rotatable about ball bearing pivots 53 and 54 in standards 50. In sectional view 6 a stylus 21' is shown bearing on a hemispherically curved groove 57 in a piece of work 55. The work 55 is held firmly in position for inspection by work holder 56 which is shown mounted on a horizontally and vertically adjustable work table 60. The table 60 is slidably dovetailed to sections 61 and 62. Sections 60 and 62 are moved vertically when adjustment screw 58 is turned and section 62 is moved horizontally when adjustment screw 59 is turned. In this manner the groove 57 in work 55 is brought into contact with stylus 21', exerting enough pressure on the stylus to give a zero scale reading on the electronic voltmeter by means previously described. Since the pickup mechanism 51 is mounted so that the stylus 21' does not coincide with the axis of rotation of the arm 52 which is through the centers of pivots 53 and 54, but is actually extended beyond that axis of rotation, then the stylus describes a relatively small arc when arm 52 is rotated. By varying the position of the pickup mechanism it is readily seen that arcs of various radii are described by the stylus. However in production inspection of the radius contours of thousands of grooves having equal radii only one position of the pickup mechanism is necessary.

As the arm 52 is rotated, the stylus moves along the surface of the groove 57. The reading of the electronic voltmeter remains at zero indicating a surface contour of constant radius until such time as the stylus contacts some surface irregularity should there be any present. If an irregularity should be indicated by the electronic voltmeter, the frame 50 is provided with an indexing mechanism 64 for holding the arm 52 firmly in check by notching into groove 65 until a steady and true reading for the particular irregularity can be observed.

It is readily understood that other applications of this displacement pickup mechanism are possible such as the inspection of the internal and external surfaces of tubular devices such as gun barrels, pipes and the like.

I claim:

1. An electrical displacement pickup mechanism to measure irregularities in geometrically regularly shaped surfaces comprising an insulating frame, a driving coil and two pickup coils, said pickup coils being mounted on opposite sides of said driving coil and all three of said coils being wound about the same axis, an armature mounted centrally with respect to said driving coil and said pickup coils, two spring arms attached to said frame to hold said armature in normal alignment within said coils, and a stylus fixedly mounted on one of said arms to bear on work surfaces and to cause the armature to be displaced from its reference position as said stylus bears on any irregularity on the work surfaces.

2. In an electronic instrument for measuring irregularities on work surfaces, a vacuum tube oscillator, and a vacuum tube voltmeter in combination with a displacement pickup mechanism, said mechanism comprising an insulating frame, a driving coil and two pickup coils, said pickup coils being mounted on opposite sides of said driving coil and all three of said coils being wound about the same vertical axis, an armature mounted centrally with respect to said driving coil and said pickup coils, two spring arms attached to said frame to hold said armature in normal alignment within said coils at the electrical center of said coils, a stylus fixedly mounted on one of said arms to bear on work surfaces and to cause the armature to be displaced from its electrical center position within said coils as said stylus bears on an irregularity on a work surface leads from the driving coil connected to the vacuum tube oscillator circuit to transmit a signal to said driving coil, a lead from one pickup coil to the other to connect said coils in electrical opposition, and leads from the pickup coils connected to the circuit of the vacuum tube voltmeter to transmit any differential in voltage, induced by the driving coil in said pickup coils as the armature is displaced from its electrical center by movement of the stylus across an irregularity on a work surface, to the vacuum tube voltmeter.

3. In an electronic instrument comprising a vacuum tube oscillator, a displacement pickup mechanism including a driving coil, a pair of pick-up coils, one of which is located on one side of said driving coil and the other pick-up coil located on the opposite side of said driving coil, an armature and means for flexibly mounting the same centrally of said coils, a stylus connected to said armature for moving the same, a vacuum tube voltmeter for the purpose of measuring irregularities on work surfaces, oscillator means to energize said driving coil in said displacement pickup mechanism, inductive means to energize in electrical opposition said pickup coils, means responsive to displacement of said armature in the electrical center of said driving coil and said pickup coils to cause the magnetic field of said driving coil to shift in the direction of movement of the armature from its electrical center so that more voltage is induced in one pickup coil than in the other, and vacuum tube voltmeter means to indicate the difference in the magnitude of the induced voltages in said pickup coils.

4. In an electronic instrument comprising a vacuum tube oscillator, a displacement pickup mechanism including a driving coil, a pair of pick-up coils, one of which is located on one side of said driving coil and the other pick-up coil located on the opposite side of said driving coil, an armature and means for flexibly mounting the same centrally of said coils, a stylus connected to said armature for moving the same, a vacuum tube voltmeter for precision measurement of minute irregularities on work surfaces, oscillator means to energize said driving coil in the displacement pickup mechanism, inductive means to energize in electrical opposition said pickup coils, means responsive to movement of said stylus on said pickup mechanism across a relatively minute irregularity on a work surface to displace said armature normally mounted in the electrical center of said driving coil and said pickup coils so that a differential occurs between the voltages induced in said pickup coils by said driving coil, transformer means to step up said induced voltage differential, amplifier means to receive and amplify said stepped up induced voltage differential from the secondary of said transformer, and vacuum tube voltmeter means to receive said amplified voltage differential and to indicate in linear measurement on a calibrated scale the height or depth of an irregularity on a work surface as it is traversed by the stylus of the pickup mechanism.

5. In a displacement pickup mechanism comprising an insulated frame, a driving coil, mounted fixedly within said frame, two electrically opposing pickup coils, one mounted on either side of said driving coil and wound about the same axis as said driving coil, two flexible arms mounted on opposite sides of said insulated frame, an armature held normally in the electrical center within said driving coil and said pickup coils by said flexible arms and a stylus for engaging work surfaces mounted rigidly on the free end of one of said flexible arms, means to supply alternating current of constant frequency and voltage to said driving coil, means responsive to movement of said stylus across an irregularity in a work surface to cause said armature to be displaced from the electrical center of said coils, means to induce unequal voltages in said pickup coils, and means to measure the magnitude of the difference of the induced voltages in said pickup coils.

6. An electrical displacement pickup mechanism to measure irregularities in geometrically regularly shaped surfaces comprising an insulating frame, a driving coil and a pair of pickup coils, an armature mounted centrally with respect to said driving coil and said pickup coils, resilient means for holding said armature in normal alignment within said coils, and a stylus carried by said resilient means for bearing on work surfaces and causing said armature to be displaced from its reference position as said stylus bears on any irregularity on the work surfaces.

JOSEPH J. NEFF.